United States Patent [19]

Simpkins et al.

[11] 4,272,526

[45] Jun. 9, 1981

[54] DERIVATIVES OF CHLORAL

[75] Inventors: David E. Simpkins, Benfleet; John B. O. Taylor, Gidea Park, both of England

[73] Assignee: Macarthys Pharmaceuticals Limited, Romford, England

[21] Appl. No.: 37,056

[22] Filed: May 8, 1979

[30] Foreign Application Priority Data

Jul. 11, 1978 [GB] United Kingdom ............... 29451/78

[51] Int. Cl.³ ..................... A61K 31/715; C07H 1/00
[52] U.S. Cl. ......................................... 424/180; 536/1;
    536/3; 536/30; 536/33; 536/43; 536/44;
    536/45; 536/48; 536/49; 536/50; 536/54;
    536/56; 536/58; 536/59; 536/63; 536/66;
    536/84; 536/91; 536/92; 536/96; 536/98;
    536/102; 536/103; 536/111; 536/115; 536/116;
    536/118; 536/120
[58] Field of Search ................ 536/1, 3, 30, 33, 43,
    536/44, 45, 84, 85, 90, 83, 91, 102, 111, 103,
    112, 116, 120, 118, 122, 46, 48, 49, 50, 54, 56,
    58, 59, 63, 66, 92, 96, 98, 115; 424/180

[56] References Cited
U.S. PATENT DOCUMENTS

| | | | |
|---|---|---|---|
| 2,140,346 | 12/1938 | Bley | 536/120 |
| 3,221,338 | 11/1965 | Segal | 536/84 |
| 3,615,649 | 10/1971 | Parish et al. | 536/122 |
| 3,753,976 | 8/1973 | Grass et al. | 536/1 |
| 3,878,298 | 4/1975 | Parish et al. | 536/1 |

*Primary Examiner*—Johnnie R. Brown
*Attorney, Agent, or Firm*—Stevens, Davis, Miller & Mosher

[57] ABSTRACT

The present invention relates to a chloral derivative having the general formula

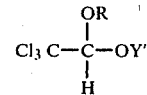

in which Y' is a polysaccharide consisting of a chain of anhydroglucose, modified anhydroglucose or uronic acid units as substituent group and in which R is selected from —H, —COCH$_2$OH, —[(CH$_2$)$_n$O]$_\chi$ —H in which n is 2 to 5 and $\chi$ is 1 to 7; —CH$_2$OSO$_2$X' or —CH$_2$COOX' in which X' is NH$_4$ or a single equivalent of a non-toxic metallic cation, —(CH$_2$)$_n$H where n is 1 to 7, —(CH$_2$)$_n$(OH)$_\chi$Y where Y is —H or —CH$_3$ n is 1 to 7, $\chi$ is 1 to 12 and the —OH groups are attached to any or all of the carbon atoms by substitution and wherein when Y$^1$ is a chain of unmodified anhydroglucose units, these units have the following configurations:

α-D-glucopyranosyl units having a predominantly 1-4 linkage

β-D-glucopyranosyl units having a predominantly 1-4 linkage and/or

β-D-glucopyranosyl units having a predominately 1-4 linkage when C$_6$ is a carboxylic acid group.

11 Claims, No Drawings

DERIVATIVES OF CHLORAL

DESCRIPTION

The present invention relates to derivatives of chloral and to therapeutic compositions including such derivatives.

Chloral hydrate and its derivatives have been employed in clinical practice for many years as hypnotic agents. These compounds have, however, many practical disadvantages which have prevented their wider use. They are usually extremely unpleasant tasting substances which are difficult to taste-mask. The common form, chloral hydrate, is also a volatile, crystalline material from which it is difficult to make a solid dosage of the pure substance. As a result, the medicament has frequently been administered in liquid dosage form, in spite of the unpleasant taste. Some solid dosage forms have been made practical hitherto by the chemical combination or complexation of chloral or chloral hydrate with other substances so as to form a solid, less volatile substance. Such known compounds or complexes have themselves certain disadvantages in that they may have variable bioligical availability or, alternatively the substance with which the chloral or chloral hydrate is complexed or combined may be more toxic than the chloral hydrate itself.

British Pat. No. 1,046,612 relates to a compound or complex of dextran and chloral. The Specification is concerned with the preparation of a compound or complex of dextran and chloral which comprises heating chloral or chloral hydrate and dextran at a temperature of from 80°–90°.

According to the present invention there is provided a chloral derivative having the general formula

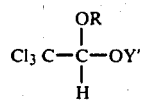

in which Y' is a polysaccharide consisting of a chain of anhydroglucose, modified anhydroglucose or uronic acid units as substituent group and in which R is selected from —H, —COCH$_2$OH, — [(CH$_2$)$_n$O]$_\chi$—H in which n is 2 to 5 and $\chi$ is 1 to 7; —CH$_2$OSO$_2$X' or —CH$_2$COOX' in which X' is NH$_4$ or a single equivalent of a non-toxic metallic cation, —(CH$_2$)$_n$H where n is 1 to 7, —(CH$_2$)$_n$(OH)$_\chi$Y where Y is —H or —CH$_3$ n is 1 to 7, $\chi$ is 1 to 12 and the —OH groups are attached to any or all of the carbon atoms by substitution, and wherein when Y$^1$ is a chain of unmodified anhydroglucose units, these units have the following configurations:

α-D-glucopyranosyl units having a predominantly 1-4 linkage

β-D-glucopyranosyl units having a predominantly 1-4 linkage and/or

β-D-glucopyranosyl units having a predominantly 1-4 linkage when C$_6$ is a carboxylic acid group.

The anhydroglucose may be modified and the chloral may be linked through free hydroxyl groups on the anhydroglucose or uronic acid substituent. The anhydrogroglucose or uronic acid substituent may be selected from one or more of hydroxypropylmethyl cellulose, hydroxypropyl cellulose, hydroxyethylmethyl cellulose, hydroxyethylethyl cellulose, ethyl cellulose and its esters, methyl cellulose propylene glycol ether, hydroxyethyl cellulose, cellulose, methyl cellulose, methylethyl cellulose, sodium carboxymethyl cellulose, cellulose glycollic acid, oxidised cellulose, cellulose acetates, sodium carboxymethoxyl hydroxymethyl cellulose, hydroxyalkyl starches, alginic acid its salts and esters, dextrin, sodium carboxymethyl starch, cellobiose, and sodium cellulose sulphate.

The present invention also includes a method of forming a chloral derivative in accordance with the present invention by reacting chloral or chloral alcoholate with the anhydroglucose and/or uronic acid compound having the general formula R—O—Y' where R and Y' are as defined above and thereafter recovering and purifying the product. The reaction is preferably carried out in the presence of an inert solvent. The inert solvent is typically selected from those comprising carbontetrachloride, chloroform and dimethylsulfoxide. On completion of the reaction, the reaction product may be concentrated and the product filtered. The reaction product may be further purified by washing with solvent or where the product is soluble by fractional recrystallisation.

The invention also includes a therapeutic composition comprising a therapeutically effective amount of the derivative of the invention with a pharmaceutically acceptable excipient. The excipient may be a solid and the composition may be in the form of tablets, capsules, granules or lozenges. In the alternative, the excipient may be a liquid in which case the derivative may be present as a suspension. The composition of the present invention may be provided in unit dosage form whereby each dosage contains 50 mg. to 1000 mg. of the derivative. A unit dosage may comprise a lozenge or tablet or, in the alternative, may comprise a specified amount of liquid or suspension.

The anhydroglucose or modified anhydroglucose units or chains of uronic acids are generally polysaccharide derivatives having the general structure III to VII as hereinafter set forth.

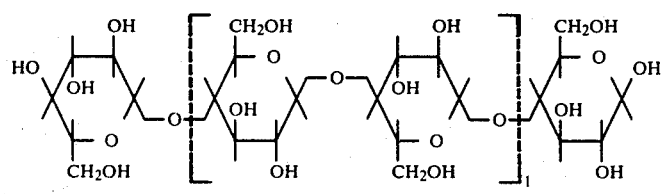

III

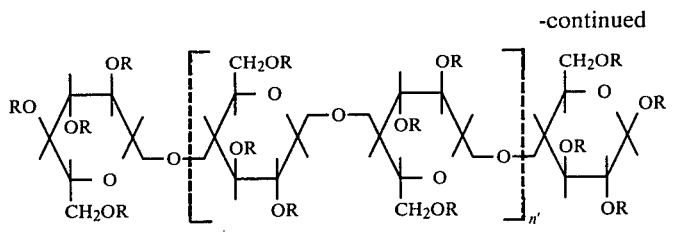

IV

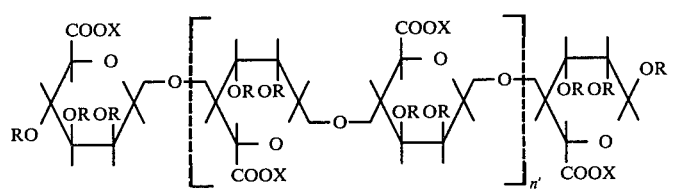

V

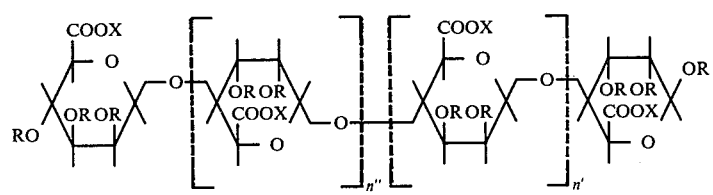

VI

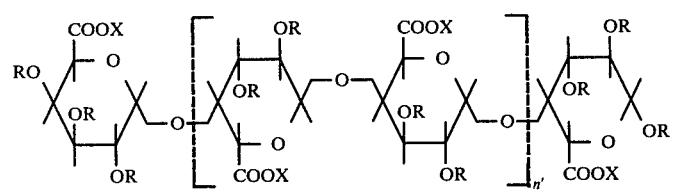

VII

Where R may be —H, —COCH$_2$OH, —[(CH$_2$)$_n$O]$_\chi$H (where n is 2 to 5 and $\chi$ is 1 to 7) —CH$_2$OSO$_2$X$^1$ or —CH$_2$COOX$^1$ (Where X$^1$ is an ammonium ion or a single equivalent of a non-toxic metallic cation), (—CH$_2$)$_n$H (where n is 1 to 7, $\chi$ is 1-12 and the —OH or OHs are attached to any or all of the carbonatoms by substitution, and where X is an ammonium ion or a single equivalent of a non-toxic metallic cation (for example an alkaline-earth metal), —CH$_3$, —(CH$_2$)$_n$CH$_3$(n is 1 to 5), —(CH$_2$)$_n$(OH)$_\chi$Y (where Y is —H or —CH$_3$, n is 1 to 7, $\chi$ is 1 to 12, and the —OH or —OHs are attached to any or all of the carbon atoms by substitution of —H; or NH$^+$(R$^1$)$_3$ (where R$^1$ is —CH$_3$—(CH$_2$)$_n$CH$_3$, —(CH$_2$)$_n$CH$_2$OH and R$^1$ may be all the same or a mixture of the aforegoing, where n is 1 to 5).

A mixture of different groupings specified above may be attached to the anhydroglucose, modified anhydroglucose, or uronic acid substituent, but, for practical purposes, there should be one or more —OH groups attached to the anhydroglucose or uronic acid substituent group. It should be noted that the formulae III to VII set out above need not necessarily be limited as to the configuration of the hydroxyl group or glycosidic bond but are merely given as examples. When chloral reacts with the above compounds, it combines in a manner similar to that when it reacts with water to form chloral hydrate (VIII).

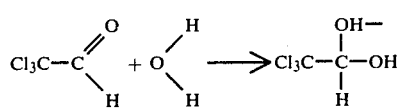

VIII except that it reacts with the —OH groups of the general compounds described under III to VII

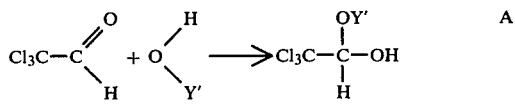

A

Where Y$^1$ represents the anhydroglucose, modified anhydroglucose, or uronic acid compounds described under III to VII.

Chloral may also react with certain of the types of compounds described under III to VII of the type R—O—Y$^1$ (where R and Y$^1$ are as previously described).

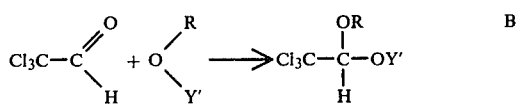

B

Chloral Alcoholates may also react in either of the types of reactions A or B

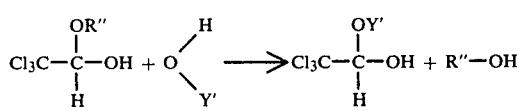

where Y$^1$ is as before and R$^{11}$ is CH$_3$(CH$_2$)$_n$— (n is 0 to 5).

An example of reaction A would be that of chloral with hydroxyethylcellulose—IX.

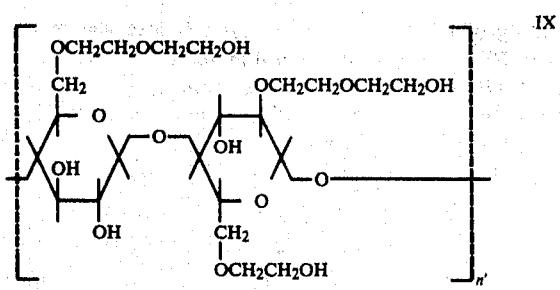

IX

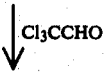

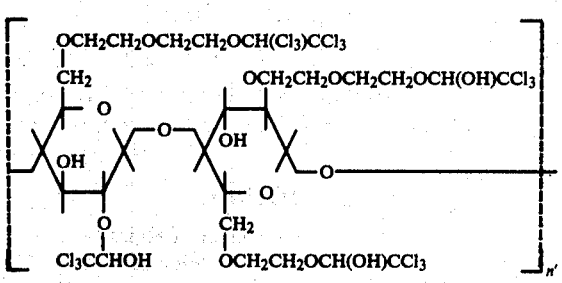

An example of reaction B would be that of chloral with methylcellulose—X.

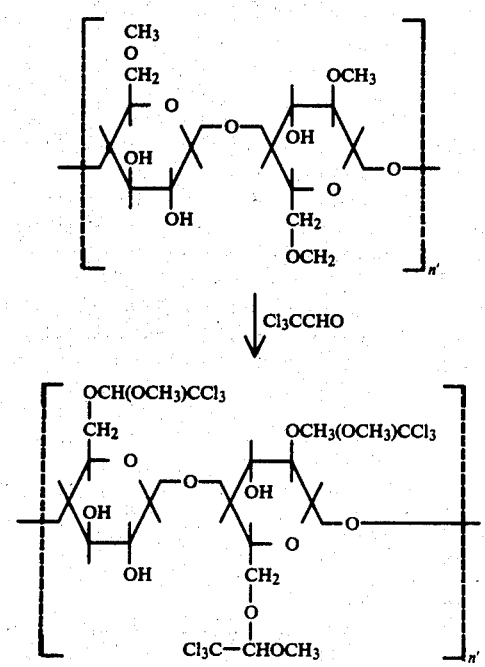

X

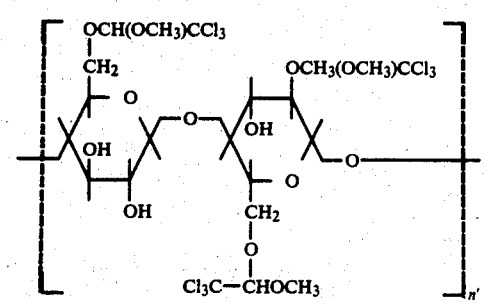

Reactions with chloral of type 'B', within the scope of this specification do not usually readily occur and in the example given chloral probably also reacts with the —OH groups directly on the anhydroglucose ring structure, and any free —CH₂OH side chains. It will be noted that on the anhydroglucose unit itself there are three reactive hydroxyl groups.

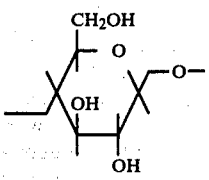

The number that is substituted in a reaction is known as the degree of substitution. It will be noted that chloral reacts also with hydroxyl groups on the side-chain of a modified anhydroglucose unit. In practice chloral seems to react with a mixture of the type of hydroxyl groups described, where both are present, and the compounds described in this specification are not limited in the number with which the chloral reacts so to form or the type of hydroxyl groups with which reaction takes place as previously described.

Since the chloral seems to preferentially react with side-chain hydroxyl groups on a modified anhydroglucose unit, the amount of chloral which will react to form compounds in accordance with the invention depends upon the degree of substitution of the modified anhydroglucose unit with which reaction takes place. By way of explanation such degree of substitution is determined by the number of hydroxyl groups which were substituted originally on the anhydroglucose unit to form the modified anhydroglucose unit. The maximum degree of substitution of the original anhydroglucose unit is 3, but any number up to that may be substituted. In long chain structures, more hydroxyl groups may be substituted in some anhydroglucose units in the chain, than in others, so that the average degrees of substitution may not be whole numbers. For example hydroxyethylcellulose is available commercially in degrees of substitution of 1.8, 2.5 and others. The reaction of chloral with the compounds described may be carried out by suspending or dissolving the carbohydrate or polysaccharide derivative in a suitable non-aqueous, non-reactive (with chloral, the carbohydrate or the polysaccharide derivative) solvent. Sufficient anhydrous chloral is added to react with the required number of hydroxyl groups. Reaction is allowed to take place with stirring under reflux and with heating if so desired or necessary. The derivative so formed is filtered off, if insoluble, or is removed by evaporation to dryness. Washing may be carried out with the solvent used for the reaction or other suitable solvent, followed by drying. Suitable solvents are chloroform, carbon tetrachloride, dimethylsulphoxide. The anhydrous chloral may first be reacted with a suitable alcohol to form the chloral alcoholate which is then used to prepare compounds embodied in this specification.

Compounds of the invention have been shown to hydrolyse readily in aqueous suspension, to chloral. In particular the hydroxyethylcellulose derivative has been found to produce the desired hypnotic effects in animals and man without any undesirable side effects.

For administration to human beings, the derivatives of the invention can be made into tablets or capsules, adding such binders, disintegrants, lubricants and flow agents as are necessary. Such materials may include starches, gums, talc, stearates, silicates and others such as are known to the art and which are pharmaceutically acceptable.

Following is a description by way of example only of methods of carrying the invention into effect:

EXAMPLE 1

5 g of hydroxyethylcellulose and 5 g chloral hydrate were heated under reflux in 25 ml. carbon tetrachloride for ten minutes. The mixture was evaporated to half its volume and filtered. The residue was washed with diethyl ether and dried under vacuum at room temperature. Content of chloral in product was 46.5% calculated as chloral hydrate. In this instance the chloral reacted predominantly with the hydroxy ethyl side-chain.

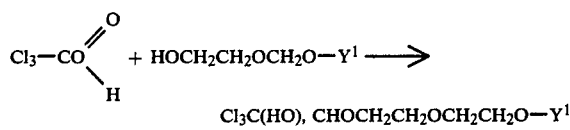

$$Cl_3C(HO), CHOCH_2CH_2OCH_2CH_2O-Y^1$$

where $Y^1$ is as previously described. Some reaction may also take place with hydroxyl groups on the ring C atoms of the anhydroglucose molecule in a similar manner.

COMPARATIVE EXAMPLE (in accordance with British Pat. No. 1,046,612)

Twenty parts of dextran of average molecular weight 9,400 supplied by Sigma London Chemical Company and 100 parts of anhydrous chloral supplied by Hopkins and Williams were mixed and the mixture was heated under stirring at 80° C. for 4 hours and at 90° C. for one hour. The hot suspension was poured slowly with stirring into 375 parts of petroleum (boiling point 100°–120° C.) and the stirring continued until the product solidified. The solid product was then washed with petroleum and with light petroleum (boiling point 40°–60° C.) and dried. The dried solid product was light brown in colour and was further dried at room temperature in a vacuum desicator. The compound or complex obtained in this way was analysied by the usual method for this type of compound i.e. by hydrolysis by sodium hydroxide. The results showed there to be an equivalent of 6.1% chloral hydrate in the product.

A further sample of the compound or complex was prepared as described, with the addition of a further 100 parts of petroleum (boiling point 100°–120° C.) to the reaction mixture containing the same proportions of dextran and chloral as described above. The product of this reaction was lighter brown than in (a) and an analysis showed to the equivalent of 6.5% of chloral hydrate in the resulting compound. The sample produced in A was analysed by the method of Pirra & Schiff for the estimation of chlorine in an organic combination. The results showed there to be 4.1% of chlorine in the compound or complex and this was the equivalent of 6.4% of chloral hydrate.

The product from A was also examined by infra red spectroscopy and the spectrum so obtained was compared with that obtained from a sample of the parent dextran. The accompanying drawing is a comparison of the infra red spectra obtained. It will be noted that the spectrum for the complex corresponds quite closely with that for dextran. Had there been a substantial proportion of chloral hydrate present there would have been a considerable difference in the overall shape particularly having regard to the possibility of chlorine peak at 800 nn. Since no difference is observable there is a minimal combination of chloral with dextran.

EXAMPLE 2

20 g of hydroxypropyl methyl cellulose was mixed with 20 ml. anhydrous chloral in 100 ml. carbon tetrachloride. The mixture was heated and stirred on a steam bath for one hour, cooled, filtered and the residue dried in vacuo at 40° C. Content of chloral in product was 23.5% calculated as chloral hydrate.

EXAMPLE 3

The synthesis in Example 2 was carried out using methyl ethyl cellulose in place of the hydroxypropyl methyl cellulose. A product containing 13.6% calculated as chloral hydrate was obtained. This is an example of reaction of type B previously described.

EXAMPLE 4

The synthesis was repeated with cellulose, refluxing for two hours before cooling, filtering and drying. A product containing 4.58% calculated as chloral hydrate was formed.

EXAMPLE 5

20 g of the propylene glycol ester of alginic acid was suspended in 50 ml. carbon tetrachloride and 20 ml. anhydrous chloral added. The mixture was stirred on a steam bath for 30 minutes, cooled, filtered, washed with carbon tetrachloride and at 45° C.

A product containing 45% calculated as chloral hydrate was obtained. This is an example of reaction with compounds of type VI as previously described.

EXAMPLE 6

3.2 g of methanol was reacted with 14.7 g anhydrous chloral to form the chloral methanolate. This product was dissolved in 100 ml. carbon tetrachloride and 15 g hydroxyethylcellulose added.

The mixture was refluxed for 15 minutes then the solvent evaporated to half its volume. The mixture was filtered, the residue washed thoroughly with diethyl ether, and dried under vacuum at room temperature. The content of chloral in the product was 47.1% calculated as chloral hydrate. This is an example of reaction of a chloral alcoholate to form products of the invention.

EXAMPLE 7

| | |
|---|---|
| Chloral-hydroxyethylcellulose derivative | 700 mg in each tablet |
| Ethylcellulose | 50 mg in each tablet |
| Alginic Acid | 15 mg in each tablet |
| Granulated and compressed into tablets. | |

EXAMPLE 8

| | |
|---|---|
| Chloral Hydroxyethylcellulose derivative | 700 mg in each tablet |
| Polyvinyl acetate | 50 mg in each tablet |
| Maize starch | 70 mg in each tablet |
| Granulated and compressed into tablets. | |

EXAMPLE 9

| | |
|---|---|
| Chloral Hydroxyethyl cellulose derivative | 350 mg |
| Fumed Silica | 4 mg |
| Talc | 4 mg |
| Lactose | 22 mg |
| Filled into hard gelatin capsules. | |

EXAMPLE 10

The compounds may be suspended in suitable flavoured, non-aqueous liquids for administration to children and infants.

For example:

| | |
|---|---|
| Chloral Hydroxyethylcellulose derivative finely powdered | 200 mg |
| Anise Oil | 0.0025 ml |
| Saccharin | 2 mg |
| Fractionated Coconut Oil to | 5.0 ml |
| 5 ml. dose of the above mixture. | |

EXAMPLE 11

The compounds may be formulated into flavoured granules of lozenges, when mixed with pharmaceutically acceptable excipients.

For example:

| | |
|---|---|
| Chloral Hydroxyethylcellulose derivative | 350 mg |
| Di-pac (a proprietary tabletting sugar mixture) | 745 mg |
| Orange Powder Flavour | 2 mg |
| Tartaric Acid | 3 mg |
| 1100 mg dose of the above mixture, or compressed to form a lozenge. | |

We claim:

1. A pharmaceutical hypnotic composition comprising a chloral derivative having the general formula:

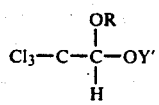

in which Y' is a polysaccharide consisting of a chain of anhydroglucose, substituted anhydroglucose or uronic acid units as substituent groups and in which R is selected from —COCH$_2$OH, —[(CH$_2$)$_n$O]$_x$—H in which n is 2 to 5 and x is 1 to 7; —CH$_2$OSO$_2$X' or —CH$_2$COOX' in which X' is NH$_4$ or an alkaline earth metal cation, —(CCH$_2$)$_n$H where n is 1 to 7, —(CH$_2$)$_n$(OH)$_x$Y where Y is —H or —CH$_3$ n is 1 to 7, x is 1 to 12 and the —OH groups are attached to the carbon atoms and wherein when Y$^1$ is a chain of unmodified anhydroglucose units, those units have the following configurations:

α-D-glucopyranosyl units having a predominantly 1-4 linkage.

β-D-glucopyranosyl units having a predominantly 1-4 linkage or

β-D-glucopyranosyl units having a predominently 1-4 linkage when C$_6$ is a carboxylic acid group; and a pharmaceutically acceptable excipient therefor.

2. A composition as claimed in claim 1 wherein the anhydroglucose is modified and the chloral is linked through free hydroxyl groups on the anhydroglucose or uronic acid substituent.

3. A composition as claimed in claim 1 or claim 2 wherein the anhydroglucose or uronic acid is a substituent derived from hydroxypropylmethyl cellulose, hydroxypropyl cellulose, hydroxyethylmethyl cellulose, hydroxyethylethyl cellulose, ethyl cellulose, methyl cellulose, propylene glycol ether, hydroxylethyl cellulose, methylethyl cellulose, sodium carboxymethyl cellulose, cellulose glycollic acid, cellulose acetates, sodium carboxymethoxyl hydroxymethyl cellulose, hydroxyalkyl starch, alginic acid, sodium carboxymethyl starch, and sodium cellulose sulphate.

4. A therapeutic composition comprising an effective amount of the composition claimed in claim 1 as a hypnotic agent together with a pharmaceutically acceptable excipient.

5. A therapeutic composition as claimed in claim 4 wherein the excipient is a solid and the composition is in the form of tablets, capsules, granules or lozenges.

6. A therapeutic composition as claimed in claim 4 wherein the excipient is liquid and the derivative is present in the form of a suspension.

7. A therapeutic composition as claimed in claim 5 provided in a unit dosage form wherein each dosage contains 50 mg. to 1000 mg.

8. A method of forming the derivative of claim 1 or 2 which method comprises reacting chloral or chloral alcoholate with anhydroglucose or uronic acid compound having the general formula R—O—Y' where R and Y' are as defined in claim 1 and thereafter recovering and purifying the product.

9. A method as claimed in claim 8 wherein the inert solvent is selected from carbontetrachloride, chloroform and dimethylsulfoxide.

10. A method as claimed in claim 9 wherein the products of the reaction are concentrated and the product filtered.

11. A method as claimed in claim 9 wherein the product is further purified by absorbing in a suitable solvent and by fractional recrystallization.

* * * * *